(12) United States Patent
Mori et al.

(10) Patent No.: US 9,278,497 B2
(45) Date of Patent: Mar. 8, 2016

(54) GLASS-RESIN LAMINATE, GLASS ROLL PRODUCED BY WINDING THE SAME, AND METHOD OF PRODUCING GLASS ROLL

(75) Inventors: Hiroki Mori, Otsu (JP); Yasuo Teranishi, Otsu (JP); Koichi Mori, Otsu (JP); Kaoru Mitsugi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 781 days.

(21) Appl. No.: 13/222,047

(22) Filed: Aug. 31, 2011

(65) Prior Publication Data

US 2012/0156439 A1    Jun. 21, 2012

(30) Foreign Application Priority Data

Aug. 31, 2010    (JP) ................................. 2010-194724

(51) Int. Cl.
| | |
|---|---|
| B32B 3/00 | (2006.01) |
| B32B 17/06 | (2006.01) |
| B32B 17/00 | (2006.01) |
| B32B 17/10 | (2006.01) |
| B32B 3/02 | (2006.01) |

(Continued)

(52) U.S. Cl.
CPC ... *B32B 3/02* (2013.01); *B32B 7/06* (2013.01); *B32B 17/064* (2013.01); *B32B 27/32* (2013.01); *B32B 27/36* (2013.01); *B32B 2250/02* (2013.01); *B32B 2250/03* (2013.01); *B32B 2250/40* (2013.01); *B32B 2307/54* (2013.01); *B32B 2307/734* (2013.01); *B32B 2457/20* (2013.01); *Y10T 428/24752* (2015.01)

(58) Field of Classification Search
CPC .......... B32B 7/06; B32B 17/00; B32B 17/06; B32B 17/064; B32B 17/10; B32B 17/10018; B65H 18/28; B65H 2511/142; B65H 2515/37
USPC ............. 428/77, 78, 189, 192, 426, 430, 435, 428/441, 906, 40.1, 41.7, 41.8; 156/99
See application file for complete search history.

(56) References Cited

U.S. PATENT DOCUMENTS

2005/0253277 A1*  11/2005  Yamanaka et al. ............ 257/778
2009/0114342 A1    5/2009  Aoki et al.

(Continued)

FOREIGN PATENT DOCUMENTS

| | | |
|---|---|---|
| EP | 2 204 355 | 7/2010 |
| JP | 63-139923 | 9/1988 |

(Continued)

OTHER PUBLICATIONS

Chinese Office Action issued Mar. 25, 2014 in corresponding Chinese Patent Application No. 201180025218.7 with two partial English translations.

(Continued)

*Primary Examiner* — Catherine A Simone
(74) *Attorney, Agent, or Firm* — Wenderoth, Lind & Ponack, L.L.P.

(57) ABSTRACT

A glass-resin laminate comprises an elongate glass film having a thickness of 1 to 300 μm, and a peelable elongate resin film having a thickness of 1 to 300 μm and a tensile modulus of elasticity of 0.3 Gpa or more. The elongate resin film is laminated on at least one surface of the elongate glass film so that the elongate resin film protrudes from edges on both sides in a lateral direction of the elongate glass film.

8 Claims, 3 Drawing Sheets

(51) Int. Cl.
*B32B 7/06* (2006.01)
*B32B 27/32* (2006.01)
*B32B 27/36* (2006.01)

(56) References Cited

U.S. PATENT DOCUMENTS

| | | |
|---|---|---|
| 2009/0314032 A1 | 12/2009 | Tomamoto et al. |
| 2010/0192634 A1 | 8/2010 | Higuchi et al. |
| 2011/0177290 A1 | 7/2011 | Tomamoto et al. |
| 2011/0177325 A1 | 7/2011 | Tomamoto et al. |
| 2011/0192878 A1 | 8/2011 | Teranishi et al. |
| 2011/0200812 A1 | 8/2011 | Tomamoto et al. |

FOREIGN PATENT DOCUMENTS

| | | |
|---|---|---|
| JP | 2001-097733 | 4/2001 |
| JP | 2001-113631 | 4/2001 |
| JP | 2008-133174 | 6/2008 |
| WO | 2009/057460 | 5/2009 |
| WO | 2010/038757 | 4/2010 |
| WO | 2010/038758 | 4/2010 |
| WO | 2010/038759 | 4/2010 |
| WO | 2010/038761 | 4/2010 |

OTHER PUBLICATIONS

"Thermoplastic Film for Heat-Sensitive Duplicating Stencil", Wang Shuming, 18th Stage, pp. 8-11, Feb. 18, 1989, cited in Office Action.
International Preliminary Report on Patentability and Written Opinion of the International Searching Authority issued Mar. 21, 2013 in International (PCT) Application No. PCT/JP2011/069713.
International Search Report issued Nov. 29, 2011 in corresponding International (PCT) Application No. PCT/JP2011/069713.
Supplementary European Search Report dated Aug. 14, 2013 issued in corresponding European Patent Application No. 11821845.2.
Masaya Kurata, "Technical Readings in Plastic Materials", published Jul. 30, 1988.
Tsuruo Sakai, "New Applied Technology in Adhesive Products", published Jan. 5, 1989.
Taiwanese Office Action received Apr. 8, 2015 in corresponding Patent Application No. 100131318 with English Translation of Search Report.

\* cited by examiner

GLASS-RESIN LAMINATE, GLASS ROLL PRODUCED BY WINDING THE SAME, AND METHOD OF PRODUCING GLASS ROLL

TECHNICAL FIELD

The present invention relates to a glass-resin laminate, which is produced by laminating, on a resin film, a glass film used for a glass substrate for devices such as a flat panel display exemplified by a liquid crystal display or an OLED display, and a solar cell, a cover glass for an OLED lighting device, and the like, a glass roll, which is produced by winding the glass-resin laminate, and a method of producing a glass roll.

BACKGROUND ART

From the viewpoint of space saving, in recent years, there have been widely used, in place of a CRT type display, flat panel displays such as a liquid crystal display, a plasma display, an OLED display, and a field emission display. Further reduction in thickness is demanded for those flat panel displays. In particular, it is required that the OLED display be easily carried by being folded or wound and be usable not only on a flat surface but also on a curved surface. Further, it is not just displays that are required to be usable not only on a flat surface but also on a curved surface. For example, if a solar cell or an OLED lighting device can be formed on a surface of an object having a curved surface, such as a surface of an automobile body, or a roof, a pillar, or an outer wall of a building, the applications of the solar cell or OLED lighting device may expand. Substrates and cover glasses used for those devices are therefore required to have a smaller thickness and to have high flexibility. Further, a glass film having a reduced thickness and high flexibility is also expected to be used for, for example, reduction in the weights of a glass substrate for devices such as a lithium ion battery, a digital signage, a touch panel, electronic paper, and the like, a cover glass for an OLED lighting device, a drug package, and a window sheet glass.

A light-emitting element used for OLED devices such as an OLED display and an OLED lighting device deteriorates in quality through the contact of gasses such as oxygen. Thus, a substrate used for the OLED devices is required to have high gas-barrier property, and hence a glass is expected to use for the substrate. However, the glass substrate is weak in tensile stress unlike a resin film, and hence is low in flexibility. Thus, application of a tensile stress on a surface of the glass substrate by bending the glass substrate tends to lead the breakage of the glass substrate. In order to impart flexibility to the glass substrate, the glass substrate is required to be reduced in thickness as described above. Thus, Patent Literature 1 below proposes a glass film having a thickness of 200 μm or less.

An elongate glass film has the advantage of being able to be packed and transported with being wound in a roll shape, however, it is necessary, in order to prevent the glass film from breaking, to interpose inserting paper between glass films or to affix a resin film which is peelable in the following process to the glass film. For example, Patent Literature 2 proposes a glass-resin laminate in which a peelable resin film is laminated on a glass film.

However, the glass-resin laminate disclosed in Patent Literature 2 has had a problem in that, when the peelable resin film is adhered to one surface of the glass film in a state of a tension being applied to the resin film, the glass film is occasionally warped significantly toward the resin film side, resulting in the occurrence of wrinkles in the resin film, which leads to a self peel-off of the resin film from the glass film. Therefore, it cannot obtain a sufficient effect to prevent the glass film from breaking.

CITATION LIST

Patent Literature

Patent Literature 1: JP 2008-133174 A
Patent Literature 2: JP 2001-097733 A

SUMMARY OF INVENTION

Technical Problem

The present invention has been made to solve the above-mentioned problems in the prior art. An object of the present invention is to provide a glass-resin laminate which is capable of suppressing warpage thereof occurring after a resin film is adhered to an elongate glass film, thereby being capable of preventing reliably the wrinkles and peel-off of the resin film due to the warpage.

Solution to Problem

In order to solve the above-mentioned problems, the present invention provides a glass-resin laminate comprising an elongate glass film having a thickness of 1 to 300 μm, and an elongate resin film having a thickness of 1 to 300 μm and a tensile modulus of elasticity of 0.3 Gpa or more, wherein the elongate resin film is peelably laminated on at least one surface of the elongate glass film so that the elongate resin film protrudes from edges on both sides in a lateral direction (width direction) of the elongate glass film.

In the present invention, the elongate resin film preferably has a pressure-sensitive adhesive force of $1 \times 10^{-3}$ to $5 \times 10^{-1}$ N/10 mm.

In the glass-resin laminate of the present invention, the elongate glass film preferably has a length of 1000 mm or more in a longitudinal direction thereof.

In the glass-resin laminate of the present invention, the elongate glass film preferably has a width of 5 mm or more.

In the glass-resin laminate of the present invention, the elongate resin film preferably protrudes by 1 mm or more from the edges on both sides in the lateral direction of the elongate glass film.

The present invention also provides a glass roll, which is produced by winding the above-mentioned glass-resin laminate.

The present invention also provides a method of producing a glass roll, the method comprising the steps of producing a glass-resin laminate by peelably laminating an elongate resin film, which has a thickness of 1 to 300 μm and a tensile modulus of elasticity of 0.3 GPa or more, on at least one surface of an elongate glass film, which has a thickness of 1 to 300 μm, so that the elongate resin film protrudes from edges on both sides in a lateral direction of the elongate glass film, and winding the glass-resin laminate in a roll shape.

In the method of producing a glass roll according to the present invention, the elongate resin film is preferably laminated on the elongate glass film, while a tension is applied to the elongate resin film.

Advantageous Effects of Invention

The glass-resin laminate of the present invention comprises an elongate glass film having a thickness of 1 to 300 μm and a peelable elongate resin film having a thickness of 1 to 300 μm and a tensile modulus of elasticity of 0.3 Gpa or more, wherein the elongate resin film is laminated on at least one surface of the elongate glass film so that the elongate resin film protrudes from edges on both sides in a lateral direction of the elongate glass film. According to the present invention, it is possible to suppress a warpage of the glass-resin laminate and to prevent wrinkles and peel-off of the resin film due to the warpage.

The reason why the warpage of a glass-resin laminate occurs is considered in terms of a force which acts to restore a resin film to its original state, when the resin film is adhered to one surface of a glass film with a tension being applied to the resin film. Further, as the warpage of the glass-resin laminate becomes larger, more wrinkles occur in the resin film, so that the self peel-off of the resin film tends to occur.

Further, when an elongate glass film and an elongate resin film are wound while being laminated, the positions of edges on both sides in the lateral direction of the elongate glass film and the elongate resin film tend to be off from each other, so that a part of the glass film is not covered with the resin film in some cases. Such the glass film is more liable to change its shape because of difference in stresses between a part covered with the resin film and a part not covered with the resin film, resulting in easier self peel-off of the resin film.

However, the glass-resin laminate of the present invention comprises the elongate resin film having a tensile modulus of elasticity of 0.3 GPa or more, and hence the elongate resin film has a small force to restore its original shape exerted after being adhered to the glass film, resulting in being capable of suppressing the warpage of the glass-resin laminate to the minimum extent. Moreover, the elongate resin film is laminated so as to protrude from edges on both sides in the lateral direction of the elongate glass film, and hence at least entire one surface of the glass film can be covered with the resin film and the self peel-off of the resin film due to application of uneven stresses can be suppressed. Note that the tensile modulus of elasticity in the present invention refers to a value measured at a temperature of 23° C.

When the glass-resin laminate of the present invention comprises the elongate resin film having a pressure-sensitive adhesive force of $1\times10^{-3}$ to $5\times10^{-1}$ N/10 mm, which shows a weak pressure-sensitive adhesiveness, the resin film can be easily peeled off from the glass film.

When the glass-resin laminate of the present invention comprises the elongate glass film having a length of 1000 mm or more in the longitudinal direction, the glass-resin laminate can be easily wound as a glass roll. As the length of the elongate glass film becomes larger, the transportability and the handleability improve, and hence the length is set to preferably $1\times10^4$ mm (10 m) or more, more preferably $5\times10^4$ mm (50 m) or more, still more preferably $1\times10^5$ mm (100 m) or more. Note that the length of the elongate glass film is preferably set to $1\times10^7$ mm (10000 m) or less from the viewpoint of improving the production efficiency (yield).

When the glass-resin laminate of the present invention comprises the elongate glass film having a width of 5 mm or more, the glass film can be used for various kinds of displays, electronic devices, or solar cells. As the width of the elongate glass film becomes larger, the elongate glass film is more likely to be applied to produce larger devices, and hence the width is set to preferably 100 mm or more, more preferably 300 mm or more, still more preferably 600 mm or more, yet still more preferably 850 mm or more. Note that the width of an elongate glass film is preferably set to 3000 mm or less from the viewpoint of improving the production efficiency (yield).

When the glass-resin laminate of the present invention comprises the elongate resin film protruding by 1 mm or more from edges on both sides in the lateral direction of the elongate glass film, the entire surface of the glass film can be reliably protected.

The glass roll of the present invention is a wound body produced by winding the glass-resin laminate in a roll shape and therefore can be easily packed and transported.

The method of producing a glass roll according to the present invention comprises the steps of producing a glass-resin laminate by laminating a peelable elongate resin film, which has a thickness of 1 to 300 μm and a tensile modulus of elasticity of 0.3 GPa or more, on at least one surface of an elongate glass film, which has a thickness of 1 to 300 μm, so that the elongate resin film protrudes from edges on both sides in a lateral direction of the elongate glass film, and winding the glass-resin laminate in a roll shape. According to the present invention, it is possible to suppress the warpage of the glass-resin laminate and therefore to prevent the wrinkles and self peel-off of the resin film due to the warpage. In addition, if an elongate glass film and an elongate resin film have the same width, it is almost impossible to make the films adhere to each other while precisely matching edges on both sides of the films to each other during winding the films in a roll shape. However, in the production method of the present invention, the elongate resin film is laminated on the elongate glass film so as to protrude from edges on both sides in the lateral direction of the elongate glass film, and hence at least entire one surface of the glass film can be covered with the resin film.

In the method of producing a glass roll of the present invention, when the elongate resin film is laminated on the elongate glass film while a tension is applied to the elongate resin film, it is possible to prevent the occurrence of wrinkles and the like during adhering. Besides, the elongate resin film is laminated on the elongate glass film so as to protrude from edges on both sides in the lateral direction of the glass film, and hence it is also possible to apply a tension while holding the protruding portion of the resin film.

DESCRIPTION OF EMBODIMENTS

Hereinafter, preferred embodiments of a glass-resin laminate and a glass roll produced by winding the glass-resin laminate according to the present invention are described with reference to the drawings.

Figure 1A:
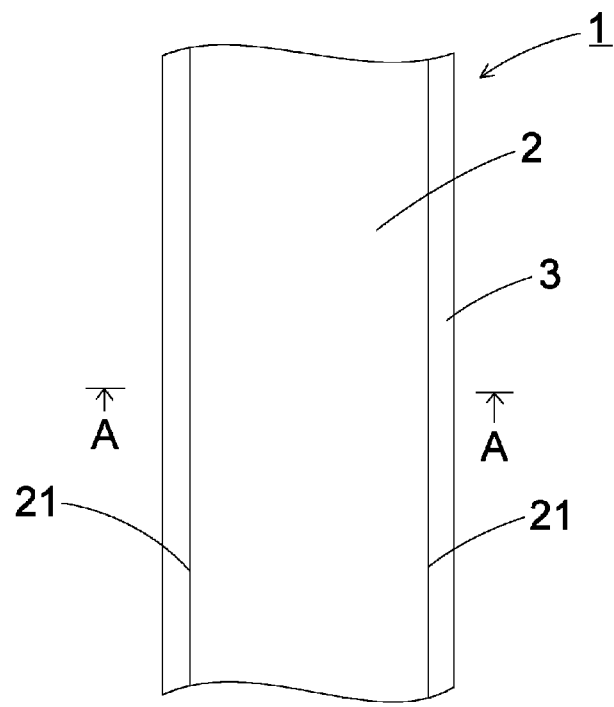
FIG. 1(a) is a plan view illustrating a glass-resin laminate according to the present invention.
Figure 1B:
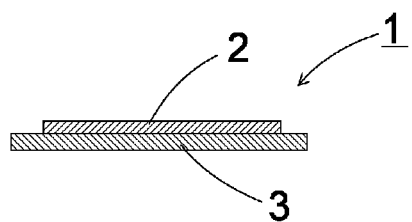
FIG. 1(b) is a cross-sectional view taken along the line A-A of FIG. 1(a).

As illustrated in FIG. 1(a) and FIG. 1(b), a glass-resin laminate 1 according to the present invention has a structure in which an elongate resin film 3 is laminated on one surface of an elongate glass film 2 so that the elongate resin film 3 protrudes from edges on both sides in a lateral (width) direction of the elongate glass film 2.

Borosilicate glass, silica glass, soda lime glass, alkali-free glass, and the like are used as materials for the glass film 2. Of those, alkali-free glass is most preferably used. This is because, if the glass film 2 contains an alkali component, cation replacement occurs on a surface layer of the glass film, leading to occurrence of the so-called too-abundant soda phenomenon and resulting in a coarse structure. In this case, if the glass film 2 is continuously used in a bent state, the glass film may break at a portion whose structure has become course because of aging degradation. Note that the alkali-free glass refers to glass substantially free of an alkali component, and specifically, glass that contains the alkali component at a weight ratio of 1000 ppm or less. The content of the alkali component in the present invention is preferably 500 ppm or less, more preferably 300 ppm or less.

The glass film 2 has a thickness of preferably 1 to 300 μm or less, more preferably 5 μm to 200 μm, still more preferably 10 μm to 100 μm, yet still more preferably 20 μm to 50 μm. As the thickness of the glass film 2 becomes smaller, the strength of the glass film tends to be more insufficient, and when the glass film 2 is peeled off from the resultant glass-resin laminate 1, the glass film 2 may break. On the other hand, as the thickness of the glass film 2 becomes larger, the flexibility of the glass film becomes worse, leading to difficulty in winding the resultant glass-resin laminate as a glass roll. Also, when the resin film 3 is adhered to the glass film 2, the warpage of the resultant glass-resin laminate does not occur easily, and hence it becomes less necessary to use a resin film having a larger tensile modulus of elasticity.

Figure 2:
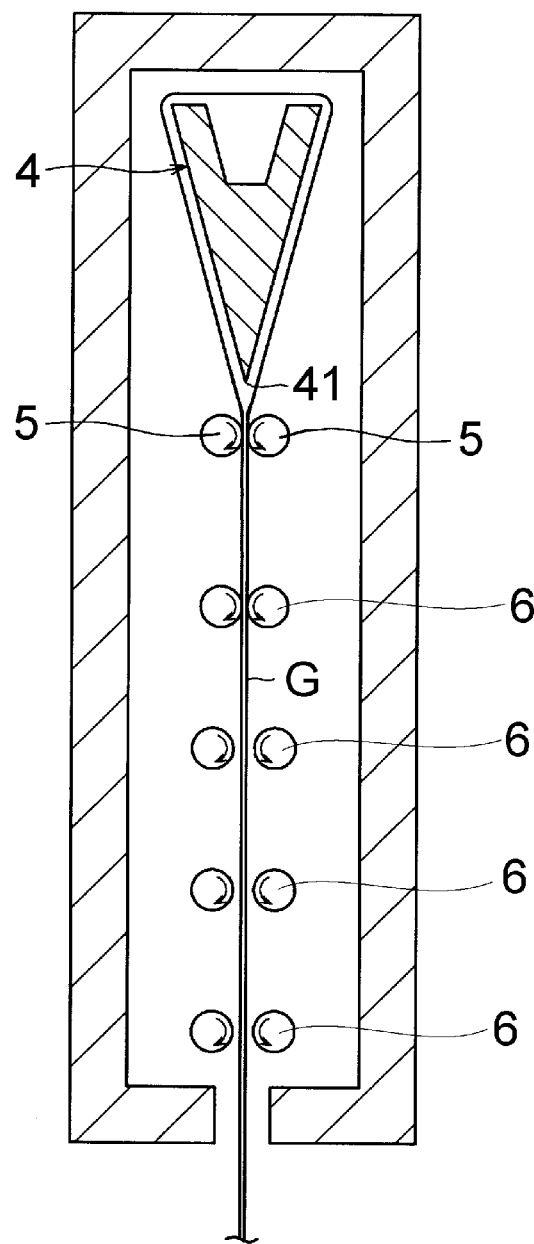
FIG. 2 is an explanatory diagram of an apparatus for producing a glass film.

The glass film 2 to be used in the present invention can be formed by an overflow down-draw method, a slot down-draw method, a re-draw method, or the like. Of those, the glass film 2 is preferably formed by an overflow down-draw method as illustrated in FIG. 2. This is because the overflow down-draw method is a forming method in which both surfaces of a glass sheet are not brought into contact with a forming member during forming molten glass into a glass sheet, and hence flaws are hardly generated on the both surfaces (transparent surfaces) of the obtained glass sheet, and high surface quality can be achieved for the glass sheet without polishing process.

In FIG. 2, molten glass supplied to a forming member 4 having a wedge shape in its cross-section flows down along both sides of the forming member 4 and meets each other at a lower end portion 41. A glass ribbon G immediately after meeting at the lower end portion 41 is drawn downwardly with a pair of cooling rollers 5 with being restricted in shrinkage thereof in a lateral (width) direction, resulting in a thin ribbon having a predetermined thickness. Subsequently, the glass ribbon G having a predetermined thickness is annealed in an annealer, drawn downwardly with annealing rollers 6 or the like to remove heat strain in the glass ribbon G, and cut into pieces each having a predetermined dimension. As a result, the glass film 2 is formed.

As illustrated in FIG. 1(a) and FIG. 1(b), the resin film 3 is laminated so as to protrude from edges on both sides in the lateral direction of the glass film 2. The protruding amount of the resin film 3 is preferably 1 mm to 200 mm, more preferably 5 to 100 mm, still more preferably 5 to 50 mm, yet still more preferably 10 to 40 mm from edges on both sides 21 in the lateral direction of the glass film 2. As the protruding amount of the resin film 3 becomes smaller, it becomes more difficult to cover reliably the entire surface of glass film 2 with the resin film 3 during winding the glass film 2 and the resin film 3. On the other hand, as the protruding amount of the resin film 3 becomes larger, handling the resultant glass-resin laminate becomes more difficult.

The thickness of the resin film 3 is 1 to 300 μm, preferably 10 to 200 μm, more preferably 30 to 100 μm. As the thickness of the resin film 3 becomes larger, the warpage of the resultant glass-resin laminate 1 becomes larger. On the other hand, as the thickness of the resin film 3 becomes smaller, the handleability and the strength lower.

As the tensile modulus of elasticity of the resin film 3 becomes larger, the warpage of the resultant glass-resin laminate 1 becomes smaller, and hence the tensile modulus of elasticity is preferably 0.3 GPa or more, more preferably 0.5 GPa or more, still more preferably 1 GPa or more, yet still more preferably 2 GPa or more. In addition, the tensile modulus of elasticity of the resin film 3 is preferably equal to or less than the Young's modulus of the glass film 2. Polyethylene terephthalate, polyamide, polyimide, polyester, polycarbonate, acryl, PEN, polypropylene, polystyrene, high-density polyethylene, polycycloolefin, and the like are used as materials for the resin film 3.

It is preferred that a peelable pressure-sensitive adhesive layer (not shown) be formed on one surface (upper surface) of the resin film 3, and the layer has a pressure-sensitive adhesive force of preferably $1 \times 10^{-3}$ to $5 \times 10^{-1}$ N/10 mm, more preferably $5 \times 10^{-3}$ to $3 \times 10^{-1}$ N/10 mm, still more preferably $1 \times 10^{-2}$ to $1 \times 10^{-1}$ N/10 mm. As a result, the resin film 3 has a weakly pressure-sensitive adhesive, and hence it is possible that the resin film 3 is easily peeled off (separated) from the glass film 2. If the pressure-sensitive adhesive force is too small, sufficient pressure-sensitive adhesiveness is not provided. In contrast, if the pressure-sensitive force is too large, the peel-off becomes difficult. Note that it is recommended that the material, thickness, and the like of the pressure-sensitive adhesive layer be suitably selected so that desired characteristics are provided.

In the present invention, a second resin film (not shown) may be laminated, if necessary, on the other surface of the glass film 2. As a result, the glass film 2 can be wholly protected.

It is recommended that the width of the second resin film be substantially the same as or lager than that of the resin film 3. A pressure-sensitive adhesive layer may be formed on the second resin film, or it may not be formed, and in this case, the second resin film is peelably adhered to the resin film 3 owing to the pressure-sensitive adhesive force of the resin film 3. That is, edges on both sides of the nonadhesive second resin film are matched to the both protruding portions of the resin film 3 and both the films are adhered to each other owing to the pressure-sensitive adhesive force of the resin film 3. Further, it is preferred to use, as a material for the second resin film, a resin having such flexibility that allows winding, for example, a resin similar to that used for the resin film 3.

Figure 3:
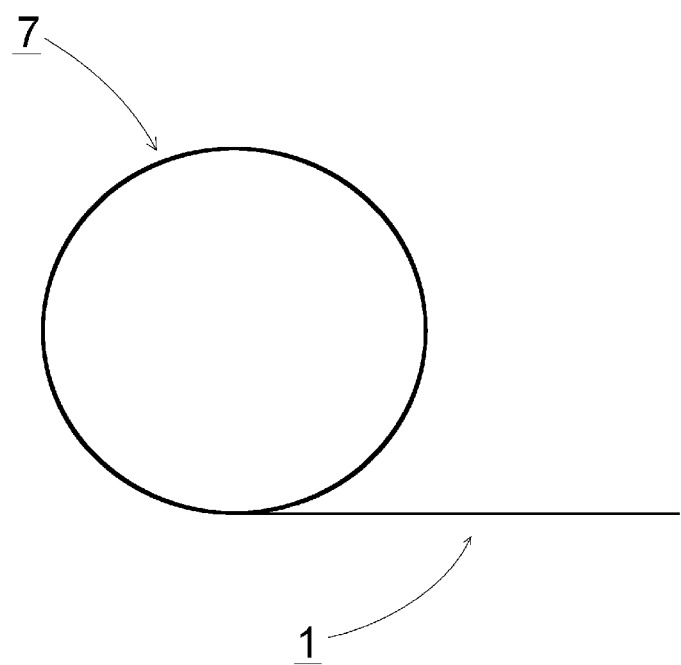
FIG. 3 is an explanatory diagram of a glass roll according to the present invention.

FIG. 3 is an explanatory diagram of a glass roll according to the present invention.

The glass roll 7 according to the present invention is formed by winding the above-mentioned glass-resin laminate 1 in a roll shape. The glass roll 7 is formed by winding the above-mentioned glass-resin laminate 1 on a core material so that the side of the resin film 3 comes outside. The resin film 3 is adhered to the glass film 2 so as to protrude from edges on both sides in the lateral direction of the glass film 2. The resin film 3 has a tensile modulus of elasticity of 0.3 GPa or more. Thus, when the glass-resin laminate 1 is drawn out from the glass roll 7, the warpage of the glass-resin laminate 1 dose not occur and therefore the self peel-off of the resin film 3 from the glass film 2 dose not occur.

EXAMPLES

The present invention is hereinafter described based on Example and Comparative Examples.

Table 1 shows the glass-resin laminates of Example (Sample No. 1) and Comparative Examples (Sample Nos. 2 and 3).

TABLE 1

|  | Sample No. | | |
|---|---|---|---|
|  | 1 | 2 | 3 |
| Material for glass film | Alkali-free glass | Alkali-free glass | Alkali-free glass |
| Thickness of glass film | 50 μm | 50 μm | 50 μm |
| Width of glass film | 300 mm | 300 mm | 300 mm |
| Material for resin film | PET | PE | PET |
| Thickness of resin film | 38 μm | 60 μm | 38 μm |
| Tensile modulus of elasticity of resin film | 4 GPa | 0.2 GPa | 4 GPa |
| Width of resin film | 410 mm | 410 mm | 290 mm |
| Reverse bending test | No self peel-off was found. | Self peel-off was found. | Self peel-off was found. |
| Placement-on-flat-surface test | No self peel-off was found. | Self peel-off was found. | Self peel-off was found. |

Each sample in Table 1 was manufactured as follows.

First, there was prepared, as a glass film, an alkali-free glass film having a thickness of 50 μm, a width of 300 mm, and a length of 3000 mm (OA-10G manufactured by Nippon Electric lass Company, Limited). Further, there was prepared, as a resin film, each resin film made of each of the materials shown in the table, having each thickness and width shown in the table, and having a length of 3000 mm. Note that PET and PE mean a polyethylene terephthalate resin and a polyethylene resin, respectively, and a pressure-sensitive adhesive layer having a thickness of 1 μm and a pressure-sensitive adhesive force of $2.7 \times 10^{-2}$ N/10 mm is formed on one surface of the each resin film.

Next, while the resin film was being adhered to one surface of the glass film so as to protrude from edges on both sides in the lateral direction of the glass film, both the films were wound around a core material (tubular body having an outer diameter of 165 mm and a width of 500 mm) so that the resin film comes outside. As a result, each sample (glass-resin laminate) was wound in a roll shape. The thus obtained glass rolls each had a winding tension of 170 N. Each glass roll was left for 1 hour and the each sample was drawn out. After that, the peel property of the each sample was tested in the state of bending the each sample in the reverse direction to the direction in which the each sample was wound as a roll (reverse bending test) and in the state of placing the each sample on a flat surface (placement-on-flat-surface test). Note that, in the reverse bending test, the each sample was bent along the surface of a vinyl chloride tube having an outer diameter of 85 mm.

The results were as follows. In the glass-resin laminate of Sample No. 1 of Example, no wrinkles and self peel-off were found. However, in the glass-resin laminates of Sample Nos. 2 and 3 of Comparative Examples, self peel-off occurred when each sample was bent in a reverse bending test. Besides, in the placement-on-flat-surface test, there was a warped portion in each of Sample Nos. 2 and 3 immediately after placing the each sample on the flat surface. Then, the resin file was itself peeled off from the edges on both sides in the lateral direction, after few minutes, the resin film was peeled off across the whole width.

Further, with respect to the glass-resin laminate of Sample No. 1, when the resin film was peeled off from the glass film while grasping the protruding portion of the resin film, the both films were able to be peeled off (separated) easily without breakage of the glass film.

It has been found from the above that, even after the glass-resin laminate of Sample No. 1 is wound in a roll shape, the self peel-off of the resin film thereof dose not occur. Thus, the glass-resin laminate of Sample No. 1 can be easily incorporated into a roll-to-roll process, which is adopted during various kinds of electronic device production-related treatments, such as forming treatment of a transparent conductive film and the like, patterning, and cleaning treatment, in an application of a flat panel display, a solar cell, or the like.

INDUSTRIAL APPLICABILITY

The glass-resin laminate of the present invention can be suitably used for, for example, the reduction in the weights of a glass substrate used for devices such as flat panel displays exemplified by a liquid crystal display or an OLED display, and a solar cell, a cover glass for an OLED lighting device, a glass substrate for a lithium ion battery, a digital signage, a touch panel, electronic paper, and the like, a drug package, and a window sheet glass.

REFERENCE SIGNS LIST

1 glass-resin laminate
2 glass film
21 edges on both sides
3 resin film
4 forming member
5 cooling roller
6 annealing roller
7 glass roll

The invention claimed is:

1. A glass roll, which is constituted by winding a glass film laminate, wherein the glass film laminate comprises:
   an elongate glass film having a thickness of 1 to 300 μm and a length of 1000 mm or more; and
   an elongate resin film having a thickness of 1 to 300 μm and a tensile modulus of elasticity of 0.3 Gpa or more, and a pressure-sensitive adhesive layer formed on one surface of the elongate resin film,
   wherein the elongate resin film is laminated on one surface of the elongate glass film so that the elongate resin film with a tension is peelably adhered to the one surface of the elongate glass film via the pressure-sensitive adhesive layer and protrudes from edges of the elongate glass film on both sides in a lateral direction,
   wherein each of protruding portions of the elongate resin film that protrude from the edges of the elongate glass film has a protruding dimension of 5 to 100 mm.

2. The glass roll according to claim 1, wherein the pressure-sensitive adhesive layer of the elongate resin film has a pressure-sensitive adhesive force of $1 \times 10^{-3}$ to $5 \times 10^{-1}$ N/10 mm.

3. The glass roll according to claim 1, wherein the elongate glass film has a width of 5 mm or more.

4. The glass roll according to claim 1, wherein the elongate glass film has a thickness of 1 to 200 μm.

5. The glass roll according to claim 1, wherein the glass film laminate is wound so that the elongate resin film comes outside.

6. The glass roll according to claim 1, wherein, between the protruding portions of the elongate resin film that are adjacent to each other in a radial direction of the glass roll, the protruding portions peelably adhere to each other via the pressure-sensitive adhesive layer.

7. A method of producing a glass roll, the method comprising:
  producing a glass-resin laminate by laminating an elongate resin film, which has a thickness of 1 to 300 μm and a tensile modulus of elasticity of 0.3 GPa or more, and which has a pressure-sensitive adhesive layer formed on one surface of the elongate resin film, on at least one surface of an elongate glass film which has a thickness of 1 to 300 μm and a length of 1000 mm or more, so that the elongate resin film with a tension is peelably adhered to the one surface of the elongate glass film via the pressure-sensitive adhesive layer and protrudes from edges of the elongate glass film on both sides in a lateral direction, wherein each of protruding portions of the elongate resin film that protrude from the edges of the elongate glass film has a protruding dimension of 5 to 100 mm; and
  winding the glass-resin laminate in a roll shape.

8. The method of producing a glass roll according to claim 7, wherein the laminating of the elongate resin film on the elongate glass film is performed while a tension is applied to the elongate resin film.

\* \* \* \* \*